(12) United States Patent
Wheeler et al.

(10) Patent No.: US 11,442,597 B2
(45) Date of Patent: *Sep. 13, 2022

(54) METHODS, SYSTEMS, AND MEDIA FOR NAVIGATING A USER INTERFACE USING DIRECTIONAL CONTROLS

(71) Applicant: Google LLC, Mountain View, CA (US)

(72) Inventors: Aaron Joseph Wheeler, San Francisco, CA (US); Chris Lauritzen, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/989,158

(22) Filed: Aug. 10, 2020

(65) Prior Publication Data
US 2020/0371649 A1 Nov. 26, 2020

Related U.S. Application Data

(63) Continuation of application No. 15/843,490, filed on Dec. 15, 2017, now Pat. No. 10,739,945, which is a continuation of application No. 14/263,419, filed on Apr. 28, 2014, now Pat. No. 9,880,705.

(51) Int. Cl.
*G06F 3/048* (2013.01)
*G06F 3/0482* (2013.01)
*G11B 27/34* (2006.01)

(52) U.S. Cl.
CPC ............ *G06F 3/0482* (2013.01); *G06F 3/048* (2013.01); *G11B 27/34* (2013.01)

(58) Field of Classification Search
None
See application file for complete search history.

(56) References Cited

U.S. PATENT DOCUMENTS

2006/0268100 A1  11/2006  Karukka et al.
2010/0122194 A1   5/2010  Rogers
(Continued)

OTHER PUBLICATIONS

Notice of Allowance dated Apr. 1, 2020 in U.S. Appl. No. 15/843,490.
(Continued)

*Primary Examiner* — Xuyang Xia
(74) *Attorney, Agent, or Firm* — Byrne Poh LLP (57) ABSTRACT

Methods, systems, and media for navigating a user interface are provided. In some embodiments, methods for navigating a user interface is provided, the method comprising: causing a user interface to be presented including media identifiers that correspond media assets; causing the media identifiers to be arranged along a first direction; causing a first media identifier at a first position to be highlighted; causing a menu element to be presented at a first menu position associated with the first media identifier; receiving an instruction from a user input device to navigate to a next element along the first direction; causing a second media identifier next to the first position to be highlighted in response to receiving the instruction; causing the menu element to be presented at a second menu position associated with the second media identifier; and inhibiting presentation of the menu element at the first menu position.

18 Claims, 8 Drawing Sheets

(56) References Cited

U.S. PATENT DOCUMENTS

| | | | |
|---|---|---|---|
| 2010/0131977 A1* | 5/2010 | San Jule | H04N 21/4782 |
| | | | 725/37 |
| 2012/0139945 A1 | 6/2012 | Choi | |
| 2012/0174039 A1 | 7/2012 | Rhoads | |
| 2013/0176338 A1 | 7/2013 | Park | |
| 2013/0198690 A1* | 8/2013 | Barsoum | G06F 3/017 |
| | | | 715/822 |
| 2013/0246970 A1 | 9/2013 | Helle | |
| 2014/0181724 A1* | 6/2014 | Kim | H04N 21/485 |
| | | | 715/775 |
| 2014/0237425 A1 | 8/2014 | Chan et al. | |
| 2015/0248204 A1* | 9/2015 | Morita | G06F 3/0482 |
| | | | 715/802 |

OTHER PUBLICATIONS

Notice of Allowance dated Oct. 12, 2017 in U.S. Appl. No. 14/263,419.
Office Action dated May 24, 2017 in U.S. Appl. No. 14/263,419.
Office Action dated Jun. 14, 2016 in U.S. Appl. No. 14/263,419.
Office Action dated Jun. 14, 2019 in U.S. Appl. No. 15/843,490.
Office Action dated Oct. 5, 2016 in U.S. Appl. No. 14/263,419.
Office Action dated Dec. 13, 2019 in U.S. Appl. No. 15/843,490.

\* cited by examiner

METHODS, SYSTEMS, AND MEDIA FOR NAVIGATING A USER INTERFACE USING DIRECTIONAL CONTROLS

CROSS-REFERENCE TO RELATED APPLICATIONS

This application is a continuation of U.S. patent application Ser. No. 15/843,490, filed Dec. 15, 2017, which is a continuation of U.S. patent application Ser. No. 14/263,419, filed Apr. 28, 2014, each of which is hereby incorporated by reference herein in its entirety.

TECHNICAL FIELD

The disclosed subject matter relates to methods, systems, and media for navigating a user interface using directional controls.

BACKGROUND

Navigating a user interface using a directional input device frustrates many users because certain functions can only be performed by selecting a particular button on the input device, or by navigating to a particular location in the user interface. Many user input devices, such as remote controls, include buttons for performing specific actions in a user interface, but they can be hard to locate and the function which they perform may be unclear. Providing options in a particular location of the user interface requires the user to navigate to that particular location of the user interface, which may require many directional inputs depending on a portion of the user interface that is currently highlighted.

Accordingly, it is desirable to provide methods, systems, and media for navigating a user interface using directional controls.

SUMMARY

In accordance with various embodiments of the disclosed subject matter, methods, systems, and media for navigating a user interface using directional controls are provided.

In accordance with some embodiments of the disclosed subject matter, a method for navigating a user interface is provided, the method comprising: causing, using a hardware processor, a user interface to be presented that includes a plurality of media identifier elements each corresponding to a media asset of a plurality of media assets; causing the plurality of media identifier elements to be arranged along a first direction from a first position of the user interface to a second position of the user interface; causing a first media identifier element at the first position to be highlighted from among the plurality of media identifier elements; causing a menu element to be presented at a first menu position associated with the first media identifier element at the first position; receiving an instruction from a user input device to navigate to a next element along the first direction; causing a second media identifier element at a third position of the user interface next to the first position along the first direction to be highlighted in response to receiving the instruction; causing the menu element to be presented at a second menu position associated with the second media identifier element; and inhibiting presentation of the menu element at the first menu position.

In accordance with some embodiments of the disclosed subject matter, a system for navigating a user interface is provided, the system comprising: a hardware processor that is programmed to: cause a user interface to be presented that includes a plurality of media identifier elements each corresponding to a media asset of a plurality of media assets; cause the plurality of media identifier elements to be arranged along a first direction from a first position of the user interface to a second position of the user interface; cause a first media identifier element at the first position to be highlighted from among the plurality of media identifier elements; cause a menu element to be presented at a first menu position associated with the first media identifier element at the first position; receive an instruction from a user input device to navigate to a next element along the first direction; cause a second media identifier element at a third position of the user interface next to the first position along the first direction to be highlighted in response to receiving the instruction; cause the menu element to be presented at a second menu position associated with the second media identifier element; and inhibit presentation of the menu element at the first menu position.

In accordance with some embodiments of the disclosed subject matter, a non-transitory computer-readable medium containing computer executable instructions that, when executed by a processor, cause the processor to perform a method for navigating a user interface is provided, the method comprising: causing a user interface to be presented that includes a plurality of media identifier elements each corresponding to a media asset of a plurality of media assets; causing the plurality of media identifier elements to be arranged along a first direction from a first position of the user interface to a second position of the user interface; causing a first media identifier element at the first position to be highlighted from among the plurality of media identifier elements; causing a menu element to be presented at a first menu position associated with the first media identifier element at the first position; receiving an instruction from a user input device to navigate to a next element along the first direction; causing a second media identifier element at a third position of the user interface next to the first position along the first direction to be highlighted in response to receiving the instruction; causing the menu element to be presented at a second menu position associated with the second media identifier element; and inhibiting presentation of the menu element at the first menu position.

In accordance with some embodiments of the disclosed subject matter, a system for navigating a user interface is provided, the system comprising: means for causing a user interface to be presented that includes a plurality of media identifier elements each corresponding to a media asset of a plurality of media assets; means for causing the plurality of media identifier elements to be arranged along a first direction from a first position of the user interface to a second position of the user interface; means for causing a first media identifier element at the first position to be highlighted from among the plurality of media identifier elements; means for causing a menu element to be presented at a first menu position associated with the first media identifier element at the first position; means for receiving an instruction from a user input device to navigate to a next element along the first direction; means for causing a second media identifier element at a third position of the user interface next to the first position along the first direction to be highlighted in response to receiving the instruction; means for causing the menu element to be presented at a second menu position associated with the second media identifier element; and means for inhibiting presentation of the menu element at the first menu position.

In some embodiments, the system further comprises: means for receiving a second instruction from the user input device to navigate to a next element along a second direction orthogonal to the first direction and toward the first menu position; and means for causing the menu element to be highlighted in response to receiving the second instruction.

In some embodiments, the system further comprises means for causing a plurality of menu option elements to be presented in response to the menu element being highlighted.

In some embodiments, the plurality of menu option elements are presented along the first direction.

In some embodiments, the second media identifier element is associated with a first type of media asset of a plurality of types of media assets, and the plurality of menu option elements that are caused to be presented are menu option elements that cause functions associated with the first type of media asset to be performed upon selection of those menu option elements.

In some embodiments, the system further comprises: means for receiving a third instruction from the user input device to navigate to a next element along the second direction back toward the second media identifier element; means for causing the second media identifier element to be highlighted in response to receiving the third instruction; and means for causing highlighting of the menu element to be inhibited in response to the second instruction.

In some embodiments, the system further comprises means for causing a second plurality of media identifier elements to be arranged along the first direction from a fourth position of the user interface to a fifth position of the user interface, the fourth position being next to the first position along a second direction orthogonal to the first direction and the fifth position being next to the second position along the second direction.

In some embodiments, the first menu position is at a position between the first position and the fourth position.

In some embodiments, the first direction corresponds to a first axis of a display on which the user interface is to be presented, and the second direction corresponds to a second axis of the display on which the user interface is to be presented.

In some embodiments, the plurality of media assets includes at least one of: a video asset, an audio asset, a playlist of video assets, a playlist of audio assets, a video game asset, a group of video game assets, an image asset, a playlist of image assets, a web content asset, a text asset, an application asset, a group of application assets, and a media content channel asset.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and/or media) for navigating a user interface using directional controls are provided.

In some embodiments, the mechanisms described herein can cause a user interface that can be navigated using directional commands received from a user input device to be presented. For example, a device using the mechanisms described herein can cause a user interface that includes media identifier elements corresponding to various videos that can be streamed to the device to be presented. These media identifier elements can be presented, for example, in a grid of media identifier elements, as a column of media identifier elements, as a row of media identifier elements, as multiple rows of media identifier elements with each row representing a group of related media assets, and/or using any other suitable technique or techniques.

In some embodiments, the mechanisms described herein can receive directional inputs (e.g., issued by a user input device), and can highlight a particular media identifier based on the received directional input. For example, the mechanisms described herein can cause various media identifiers corresponding to videos to be sequentially highlighted in response to a device using the mechanisms receiving directional inputs. In a more particular example, the mechanisms described herein can cause a first media identifier corresponding to a first video to be highlighted. Upon receiving a request to navigate to the right, the mechanisms described herein can cause a second media identifier corresponding to a second video to be highlighted, where the second media identifier is presented to the right of the first media identifier in the user interface.

In some embodiments, the mechanisms described herein can cause a menu element to be presented in association with the currently highlighted media identifier element. For example, the menu element can be presented in the user interface near a position of the currently highlighted media identifier element such that the menu element can be navigated to from the currently highlighted media identifier element using a single directional input. Additionally, in some embodiments, each time a directional input is received, the mechanisms described herein can cause a new media identifier element to be highlighted, the mechanisms can determine whether the menu element is in a position that is associated with the newly highlighted media identifier element. If the menu element is not associated with the newly highlighted media identifier element, the mechanisms described herein can cause the menu element to be presented at a new position that is associated with the newly highlighted media identifier element.

Figure 1A:
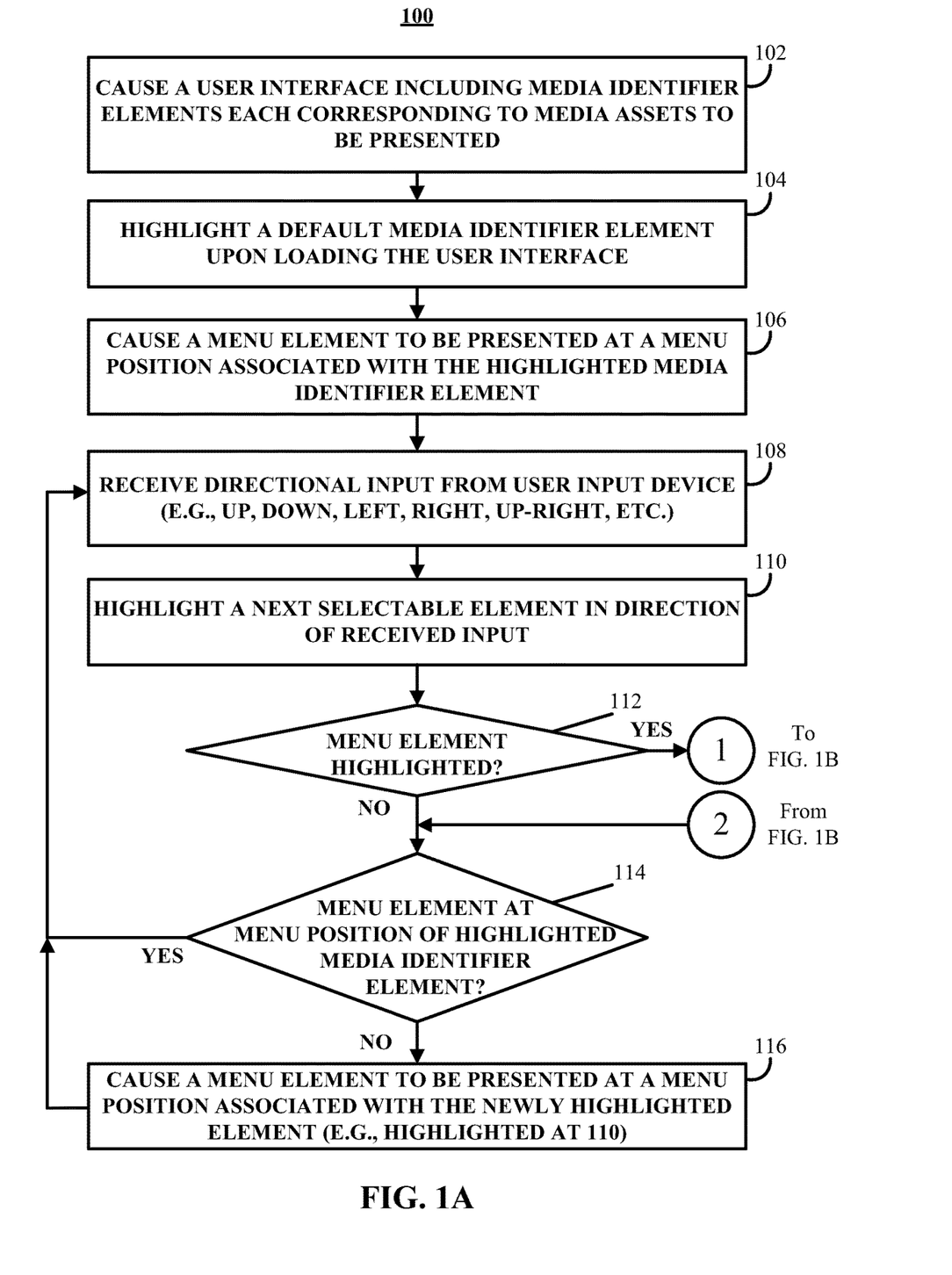
FIGS. 1A-1B show an example of a process for navigating a user interface using directional controls in accordance with some embodiments of the disclosed subject matter.
Figure 1B:
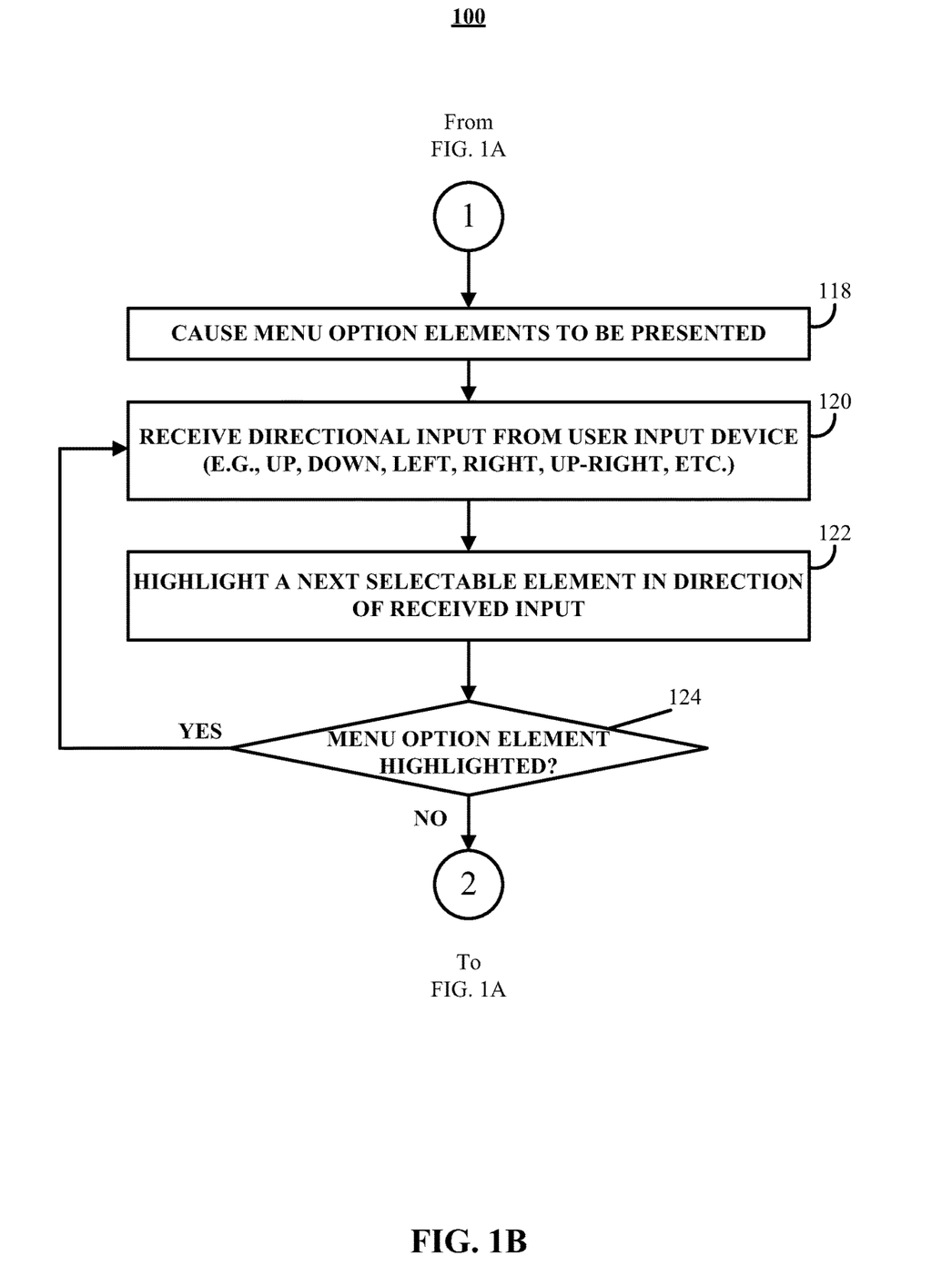

Turning to FIGS. 1A-1B, an example of a process 100 for navigating a user interface using directional controls is shown in accordance with some embodiments of the disclosed subject matter. As shown in FIG. 1A, process 100 can begin at 102 by causing a user interface that includes media identifier elements to be presented. In some embodiments, each of the media identifiers can be associated with a particular media asset. For example, the user interface presented at 102 can be a user interface for selecting a media asset and the media identifier elements can identify the media asset.

In some embodiments, media identifier elements can identify any type of media asset. For example, media assets can include audio and/or video media. As another example, media assets can include print media or image media. As still another example, media assets can include a collection of media assets, such as a playlist of videos, a playlist of songs, a collection of images, etc. As a further example, media assets can include subscription based media, such as podcasts, online magazine subscriptions, etc. As another further example, media assets can include interactive media, such as applications and video games. As another further example, media assets can include any suitable combinations of these assets and/or any other suitable assets.

In some embodiments, the media assets can be stored locally on a device executing process 100 and/or remotely. For example, media assets can include media assets such as video files or audio files that are stored locally and can be played back, copied, deleted, organized and/or otherwise used by the device executing process 100. As another example, media assets can include streaming media assets such as streaming video assets, streaming audio assets, live streamed video, live streamed audio, and/or any other media asset that can be streamed by the device executing process 100. As still another example, media assets can include media assets available for download to the device executing process 100 by purchasing the asset, borrowing the asset, renting the asset, as a freely downloadable asset, etc. Additionally or alternatively, in some embodiments, an identifier element that identifies any sort of asset can be included in the user interface. For example, search results can be presented in the user interface and identifiers for the search results can be presented with, or in lieu of, the media identifier elements. Note that search results can be search results that include media identifier elements.

In some embodiments, media identifier elements can include any suitable information for presentation. For example, media identifier elements can include images, text, video, audio, and/or any other suitable information for presentation. In some embodiments, how a particular media identifier element is presented can be based on one or more items of metadata associated with the media asset with which the media identifier is associated. For example, the media identifier element can include title information based on title metadata of the media asset. As another example, the media identifier element can include an image based on thumbnail metadata of the media asset and/or a frame of image data from the data of the media asset.

In some embodiments, how the media identifier element is presented can be based on a type of media asset with which the media identifier element is associated. For example, a media identifier element for a video asset can include information identifying the media asset as a video. As another example, the media identifier element for a playlist of media assets can include information identifying the media asset as a playlist of other media assets.

In some embodiments, the user interface can have any suitable layout and can include selectable and non-selectable elements. For example, the user interface can include graphical elements that are non-selectable, such as background graphics, descriptive information of other elements in the user interface, and/or any other suitable non-selectable graphics. As another example, the user interface can include graphical elements that are selectable such as the media identifier elements described herein, one or more menu elements and/or menu option elements, navigational elements, and/or any other suitable selectable elements. In some embodiments, the user interface can include one or more hidden elements that can be navigated to by a user performing a suitable action. Such hidden elements can be selectable and/or non-selectable. Additionally or alternatively, selectable elements can become non-selectable elements and vice versa by a user performing a suitable action, in some embodiments.

In some embodiments, a group or groups of media identifier elements can be presented within the user interface in any suitable arrangement. For example, the media identifier elements can be arranged as a column of media identifier elements. As another example, the media identifier elements can be arranged as a row of media identifier elements. As yet another example, the media identifier elements can be arranged as a grid of media identifier elements. As still another example, the media identifier elements can be arranged in any suitable pattern. As a further example, the media identifier elements can be arranged in a non-uniform pattern within the user interface (e.g., scattered randomly about the user interface). In some embodiments, the media identifier elements can be presented with any suitable spacing. For example, the media identifier elements can be presented as tiles that are directly adjacent to one another (e.g., by row, by column, in a grid, etc.). As another example, media identifier elements can be presented using uniform spacing in one or more directions. In a more particular example, media identifier elements in a same row (or column) can be uniformly spaced. In another more particular example, a space between rows (or columns) of media identifier elements can be uniform. As yet another example, spacing between media identifier elements can be based on an amount of available space in the user interface, a number of media identifier elements being presented, and/or any other suitable factors. In some embodiments, spacing of media identifier elements can be dynamic and/or can be based on a layout of one or more other elements that that are presented by the user interface.

In some embodiments, one or more of the media identifiers at various positions with the user interface can be different sizes, where the size of a media identifier can be based on any suitable factor or factors. For example, the size of the media identifier element can be based on the position of the media identifier element in the user interface. As another example, the size of the media identifier element can be based on the amount of information presented by the media identifier element in the user interface (e.g., a media identifier element with a longer title can be larger). As yet another example, the size of the media identifier element can be based on the length and/or size of the media asset to which the media identifier elements corresponds (e.g., a longer video asset can have a larger media identifier element). As still another example, the size of the media identifier element can be based on an importance of the media asset to which the media identifier corresponds, which importance can be determined on any suitable basis (e.g., user assigned, by popularity, etc.).

Figure 2A:
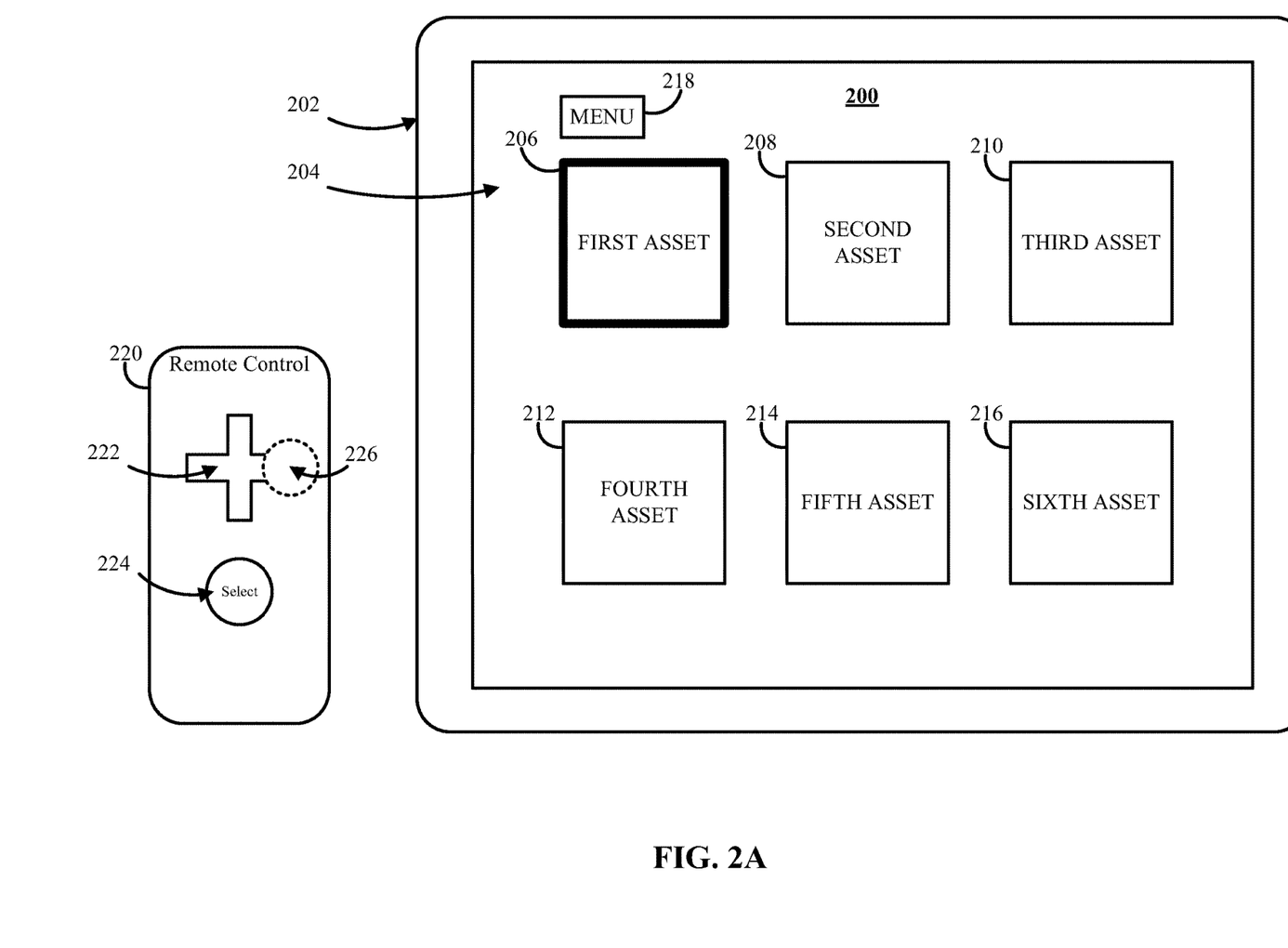
FIGS. 2A-2E show examples of a user interface navigated using directional controls in accordance with some embodiments of the disclosed subject matter.

FIG. 2A shows an example 200 of a user interface in accordance with some embodiments of the disclosed subject matter. As shown in FIG. 2A, a device 202 can include a display 204 on which user interface 200 can be presented. User interface 200 can include various media identifier elements 206-216 corresponding to different media assets. In some embodiments, user interface 200 can include a selectable menu element 218 as described in more detail below in connection with 106.

In some embodiments, a currently selectable element of user interface 200 can be highlighted. For example, as shown in FIG. 2A, media identifier element 206 is highlighted.

In some embodiments, a user input device can be used to control navigation of a user interface in accordance with some embodiments of the disclosed subject matter. For example, as shown in FIG. 2A, a remote control 220 can be used to navigate user interface 200. In a more particular example, directional inputs to a direction pad 222 can cause remote control 220 to issue directional commands to a device executing the mechanisms described herein. For example, remote control 220 can issue a "right" directional command in response to a press of direction pad 222 in an area shown with dotted circle 226 (which can correspond to a user pressing direction pad 222). In some embodiments, remote control 220 can include an input for selecting a currently highlighted element, such as a select button 224. For example, remote control 220 can issue a command that indicates selection of a currently highlighted element of user interface 200 in response to a press of select button 224.

At 104, process 100 can cause a particular media identifier element to be highlighted. In some embodiments, process 100 can cause a default media identifier element to be highlighted. For example, a media identifier element at a particular position can be highlighted initially after process 100 starts. The default media identifier element can be any media identifier element in any suitable position, such as an upper left media identifier element, a center media identifier element, a left-center media identifier element, or any other suitable position. Additionally or alternatively, process 100 can cause a media identifier to be highlighted in response to receiving a directional input. For example, until a directional input is received, process 100 can inhibit any media identifier from being highlighted, and upon receiving a directional input, can highlight a media identifier element based on the input. The media identifier element that is highlighted in response to receiving the directional input can be a media identifier element at a position based on the directional input (e.g., an upper media identifier element can be highlighted in response to receiving an "up" input), and/or can be a media identifier element at a default position (e.g., where there are multiple default positions and a directional input selects among the multiple default positions). In some embodiments, a media identifier element can be highlighted in response to navigation from a non-media identifier element that was highlighted (e.g., in response to directional inputs).

In some embodiments, a media identifier element can be highlighted using any suitable technique or combination of techniques. For example, a media identifier element can be highlighted by surrounding the element with a border of a particular color, brightness, pattern, etc. As another example, a color, shape, size, and/or any other suitable property or properties of the highlighted media identifier element can be altered with respect to other media identifier elements to indicate which media identifier element is highlighted. As yet another example, the highlighted media identifier element can be identified using text, graphics, or any other technique to differentiate the highlighted media identifier element. As still another example, the highlighted media identifier element can begin previewing the media asset to which it corresponds (e.g., can begin playing video of a video asset) to indicate that it is the highlighted media identifier element.

At 106, process 100 can cause a menu element to be presented in association with the highlighted media identifier element. In some embodiments, the menu element can be presented at a menu element position associated with the media identifier element and/or associated with a position at which the media identifier element is located. The menu element can be presented in any suitable position associated with the media identifier element. For example, a position at which the menu element is presented can be a position that is in closer proximity to the associated media identifier element than to other media identifier elements. As another example, a position at which the menu element is presented can be a position such that the menu element overlays the associated media identifier element. As yet another example, the menu element can be presented at a position that is near a particular side of the associated media identifier element. In a more particular example, the menu element can be presented along a top side, bottom side, left side, or right side, and/or at a diagonal from the associated media identifier element. In some embodiments, the menu element can be associated with multiple media identifier elements. For example, the menu element can be presented at a position that is between positions of the media identifier elements. In some embodiments, the menu element can be presented at any position at which the menu element can be navigated to from the associated media identifier element using a single directional input. In some embodiments, a position at which the menu element is presented with respect to the associated media identifier element can be based on a position of the media identifier element within the user interface. For example, the menu element can be presented nearer to a left edge of a media identifier element for media identifier elements presented on a left side of the user interface, near a center line of a media identifier element for media identifier elements presented on near a center of the user interface, and near a right edge of a media identifier element for media identifier elements presented on a left side of the user interface.

In some embodiments, the menu element can be presented using any suitable graphics, images, text, video, animation, and/or any other suitable technique or techniques, and can be presented in any suitable shape. For example, the menu element can be presented as a rectangle, circle, oval, etc., with the word "menu." In a more particular example, as shown in FIG. 2A, menu element 218 can be presented as a rectangular element near a top side of a highlighted media identifier element (e.g., media identifier element 206).

In some embodiments, as described below in connection with FIG. 1B, highlighting the menu element (e.g., menu element 218) can cause menu options to be presented. These menu options can include any suitable menu options. For example, the menu options can include a "home" option which navigates the user interface to a home screen. As another example, the menu options can include a "back" option which navigates the user interface to a previous screen. As yet another example, the menu options can include a "search" option which can cause a device executing process 100 to initiate a search based on a query input by the user. As still another example, menu options can include options based on a particular type of media asset with which the menu element is associated. In a more particular example, the menu options can include an option for adding the media asset corresponding to the associated media identifier element to a queue of media assets to be presented. In another more particular example, the menu options can include an option for finding media assets related to the media asset corresponding to the associated media identifier element. In yet another more particular example, in cases where the media asset corresponding to the media identifier includes a web page or a link to a web page, the menu options can include an option for loading the web page. In still another more particular example, the menu options can include an option to copy the media asset corresponding to the media identifier. Any other suitable options or combinations of options can be included as menu options, and the menu options presented can be tailored to the media asset corresponding to the media identifier element or elements with which the menu element is associated. In some embodiments, the associated media identifier element can be the last media identifier element that was highlighted prior to highlighting the menu element.

At 108, process 100 can receive a directional input from a user input device. In some embodiments, process 100 can receive any suitable directional input such as up, down, left, right, a diagonal (e.g., up-right, down-left, etc.), an analog directional input (e.g., received from an analog stick on a game controller), and/or any other suitable directional input. In some embodiments, the directional input can be a discrete and directionally constrained input, such as a directional input received from a direction pad on a remote control, and not a non-constrained input received from a pointing device such as a mouse or track pad. Note that, in some embodiments, a directional input, such as a swipe or flick, from a touch interface can be a directional input as described herein.

In some embodiments, the directional input can be received as a command or instruction from an input device by a device executing process 100. For example, if the device executing process 100 is a television, the directional input can be received by from a remote control. As another example, if the device executing process 100 is a game console, the directional input can be received from a controller associated with the game console. Additionally or alternatively, the directional input can be received by another device, and relayed to the device executing process 100. For example, if the device executing process 100 is a digital media receiver, the directional input can be received by a television to which the digital media receiver is coupled, and can be relayed to the digital media receiver using any suitable technique (e.g., using a communications protocol such as consumer electronics control (CEC), using an infrared blaster, over a network to which both are coupled such as a local area network, etc.). As another example, if the device executing process 100 is a television, the directional input can be received by a game console coupled to the television (e.g., from a controller associated with the game console), and can be relayed to the digital media receiver using any suitable technique (e.g., using CEC, or any other suitable communication protocol over any suitable communications link).

In some embodiments, the directional input received at 108 can be a directional input received in response to a user pressing direction pad 222 of remote control 220 (e.g., represented by dashed circle 226) as shown in FIG. 2A.

Returning to FIG. 1A, at 110, process 100 can cause a next selectable element in the direction of the received directional input to be highlighted. For example, if a "right" instruction is received, process 100 can cause a next selectable element to the right of the currently highlighted element to be highlighted. In some embodiments, circumstances where there are no more selectable elements presented in a direction indicated by the directional input can be handled using any suitable technique of techniques. For example, process 100 can cause the selectable elements (e.g., media identifier elements) to scroll to a next set of selectable elements. As another example, process 100 can cause the selectable elements of a next page of selectable elements to be presented. As yet another example, process 100 can respond to a situation where there is no next selectable element by not performing any action (e.g., continuing to highlight the currently highlighted item). Any other suitable technique and/or combination of techniques can be used when such a circumstance occurs.

Figure 2B:
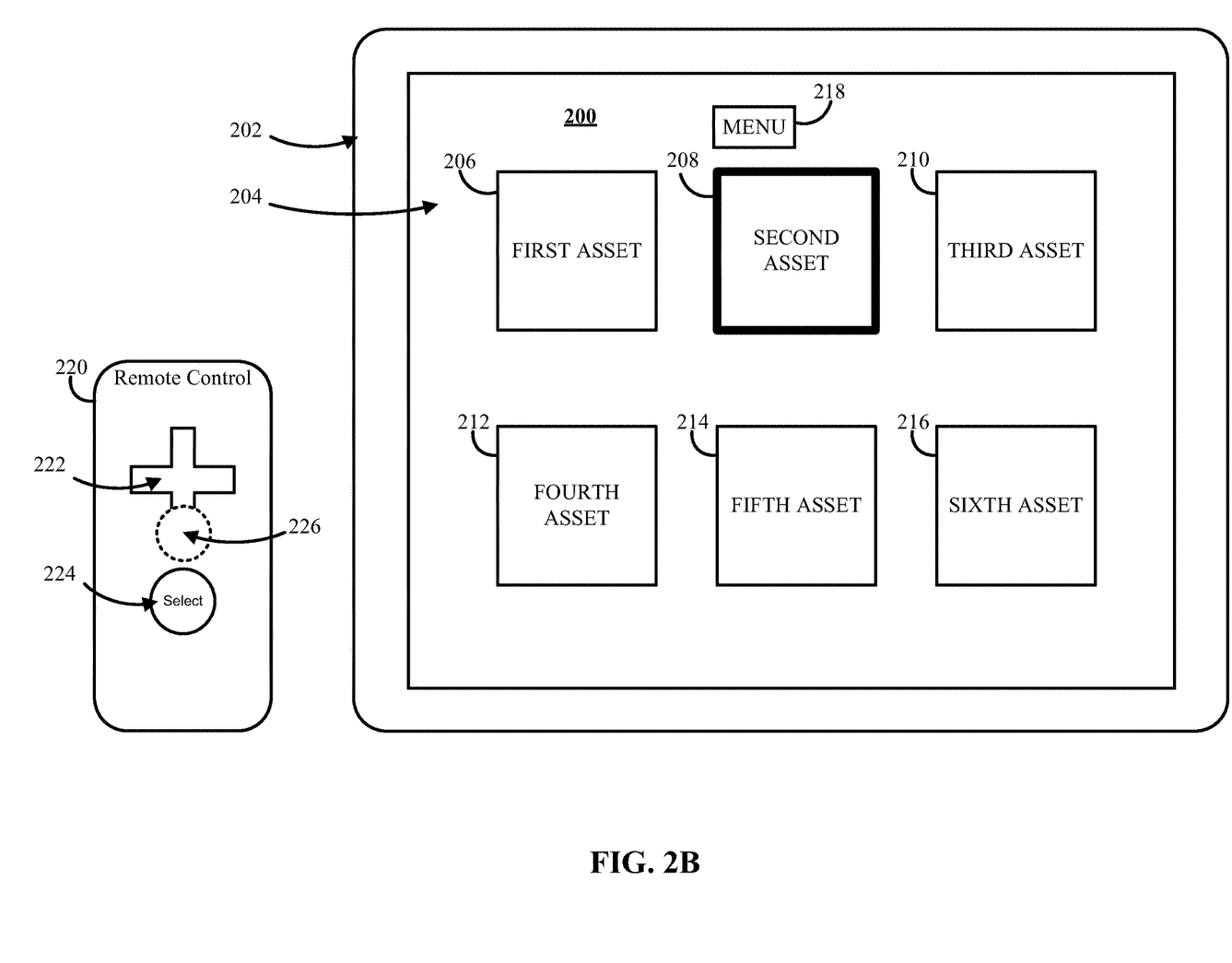

In some embodiments, after receiving the directional input represented by dashed circle 226 in FIG. 2A (e.g., a "right" directional instruction), process 100 can cause the next selectable element to the right to be highlighted. As shown in FIG. 2B, media identifier 204 can be highlighted in response to a device executing process 100 receiving a "right" command. For example, process 100 can cause media identifier element 204 to be highlighted, as shown in FIG. 2B, and inhibit media element 202 from being highlighted in response to receiving the "right" directional input.

At 112, process 100 can determine whether the menu element is the highlighted element. If the highlighted element is the menu element ("YES" at 112), process 100 can proceed to 118 described below in connection with FIG. 1B. Otherwise, if the highlighted element is not the menu element ("NO" at 112), process 100 can proceed to 114.

At 114, process 100 can determine whether the menu element is presented at a menu position associated with the element highlighted at 110. If process 100 determines that the menu element is presented at a menu position associated with the highlighted element ("YES" at 114), process 100 can return to 108 to receive another directional command. In some embodiments, the menu element can be considered by process 100 to be associated if the menu element is in a menu element position associated with the highlighted element. Additionally or alternatively, the menu can be considered by process 100 to be associated if the menu element can be navigated to in response to receiving a single directional input (e.g., a single button press on a remote control). Otherwise, if process 100 determines that the menu element is not presented at a menu position associated with the highlighted element ("NO" at 114), process 100 can proceed to 116.

Figure 2C:
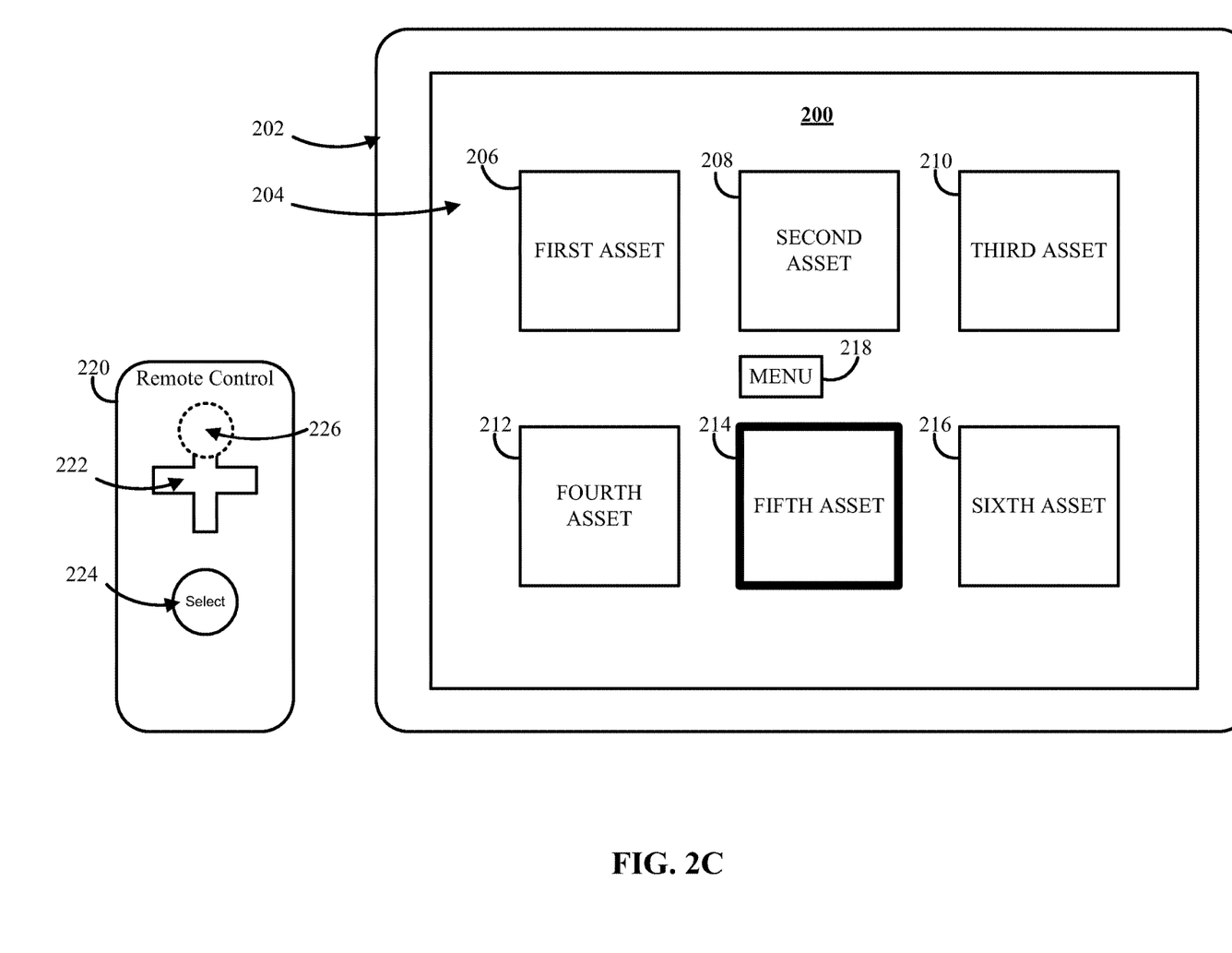

At 116, process 100 can cause the menu element to be presented at a menu position associated with the media identifier element highlighted at 110. For example, as shown in FIG. 2B, menu element 218 can be presented in the association with highlighted media identifier element 208, rather than continuing to be presented in association with media identifier 206, as shown in FIG. 2A. As another example, as shown in FIG. 2C, process 100 can receive a "down" command (e.g., in response to a user pressing a "down" direction on direction pad 222, as shown in FIG. 2B), and can, in response, highlight media identifier element 214. Process 100 can proceed to present menu element 218 in the association with highlighted media identifier element 214, as shown in FIG. 2C, rather than continuing to be presented as shown in FIG. 2B. Process 100 can return to 108 and continue to receive directional inputs after presenting the menu element at 116. In some embodiments, if the element highlighted at 110 was an element other than a media identifier element, the menu element may or may not be presented at a position associated with that element.

Figure 2D:
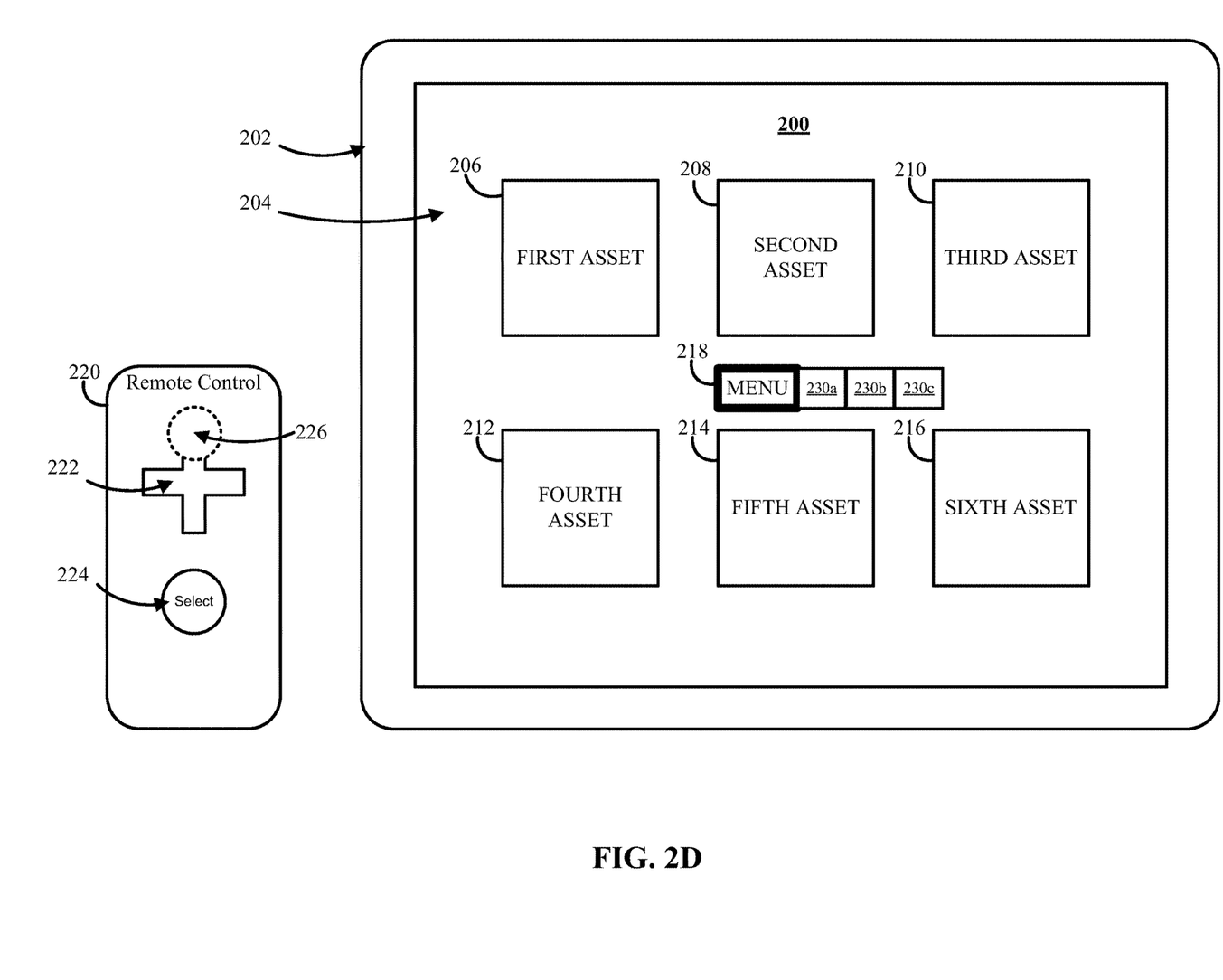

Returning to 112, if the element highlighted at 110 is the menu element ("YES" at 112), process 100 can proceed to 118. For example, as shown in FIG. 2D, menu element 218 can be highlighted in response to a device executing process 100 receiving an "up" directional input when presenting user interface 200, as shown in FIG. 2C. At 118, as shown in FIG. 1B, process 100 can cause one or more menu option elements to be presented. In some embodiments, the menu option elements can be presented in response to the menu element being highlighted. Alternatively, the menu option element can be presented in response to selection of the menu element (e.g., by receiving a "select" instruction from a user input device). In some embodiments, the menu option elements can be presented regardless of whether the menu element is highlighted. For example, rather than presenting menu element 218 including the text "menu," as described in connection with FIGS. 2A-2E, the menu options can be presented without text identifying them as being associated with menu element 218. In a more particular example, icons, text, and/or any other suitable characters or symbols for identifying an action corresponding to the menu options can be presented in the menu position. As described above in connection with 106 of FIG. 1A, the menu options presented at 118 can include any suitable number of menu options that can correspond to any suitable actions that can be performed in association with the media asset corresponding to the menu position (e.g., a media asset associated with the media identifier highlighted prior to the menu element being navigated to).

In some embodiments, the menu option element can be presented using any suitable technique or techniques. For example, as shown in FIG. 2D, menu element 218 can be highlighted and/or selected and menu options 230a-230c can be presented near menu element 218. In some embodiments, menu element 218 can be presented in a position that is associated with a media identifier element along a first direction. For example, as shown in FIGS. 2A-2E, menu element 218 can be presented in a position that is either above or below the associated media identifier element. Menu option element 230a-230c can be presented along a second direction that is orthogonal to the first direction. As shown in FIG. 2D, menu option element 230a-230c can be presented along the horizontal axis of display 202. Although menu option element 230 are described herein as being presented along an orthogonal direction to a direction in which menu element is selectable, menu option element 230 can be presented in any suitable position. For example, process 100 can cause menu option element 230 to be presented in multiple directions from menu element 218. As another example, process 100 can cause menu option element 230 to be presented in the same (or reverse) direction in which menu element 218 is selectable.

At 120, process 100 can receive directional input from a user input device (e.g., similarly to 108), and can cause a next selectable element in the direction of the received input to be highlighted, at 122 (e.g., similar to 110). For example, if menu element 218 is highlighted as shown in FIG. 2D and a "right" directional input is received, process 100 can cause menu options element 230a to be highlighted. After highlighting menu options element 230a, if an "up" directional input is received, process 100 can cause media identifier element 208 to be highlighted as the next selectable element in the "up" direction.

Figure 2E:
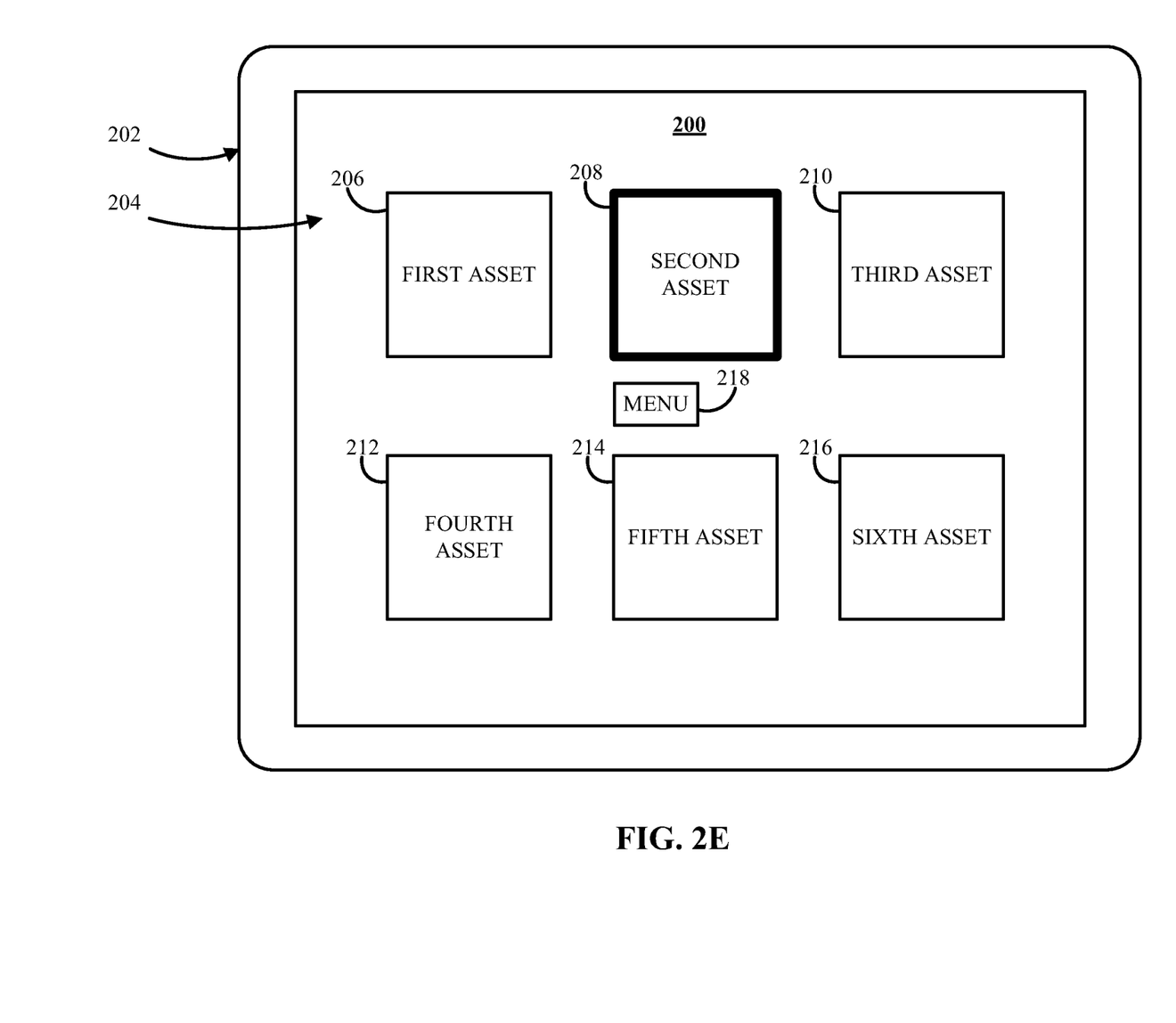

At 124, process 100 can determine whether a menu option element (or the menu element) is the highlighted element. If a menu option element is the highlighted element ("YES" at 124), process 100 can return to 120 and wait for another directional input. If a menu option element (or the menu element) is not the highlighted element ("NO" at 124), process 100 can return to 116, to determine if the menu element is in a menu position of the newly highlighted element. For example, as shown in FIG. 2E, media identifier element 208 can be the highlighted element and process 100 can determine whether menu element 218 is presented in a menu position associated with media identifier element 208. As shown in FIG. 2E, process 100 can determine, at 116, that menu element 218 is presented at a menu position associated with media identifier element 208. As shown in FIGS. 2C-2E, media identifier elements 208 and 214 can both be associated with menu element 218 as shown in FIGS. 2C-2E, and a user can navigate from media identifier element 214 to menu element 218 and/or menu option element 230, and then to media identifier element 208 without menu element 218 being presented in a different position.

In some embodiments, any suitable menu options can be presented as menu options 230, for example, as described above in connection with FIG. 2D, and selecting a particular menu option can cause a device executing process 100 to perform any suitable action.

Figure 3:
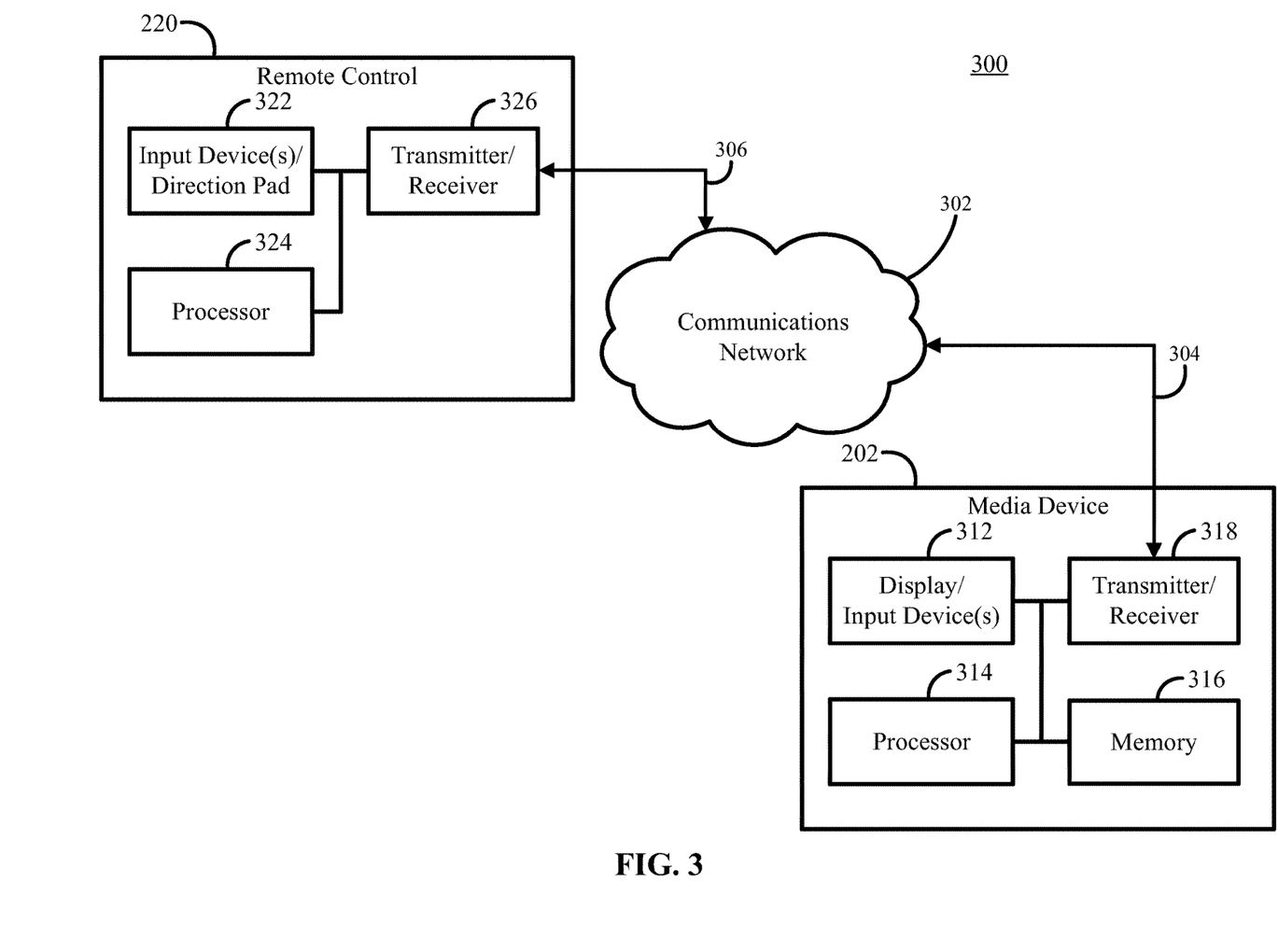
FIG. 3 shows an example of a schematic diagram of a system, including a remote control and a media device, suitable for implementation of mechanisms described herein for navigating a user interface using directional controls in accordance with some embodiments of the disclosed subject matter.

FIG. 3 shows an example 300 of a generalized schematic diagram of a system that includes a media device and a remote control on which the mechanisms for navigating a user interface using direction controls as described herein can be implemented in accordance with some embodiments of the disclosed subject matter. As illustrated, system 300 can include a remote control 220 that can be used to control one or more media devices, such as a media device 202. Remote control 220 can be connected by a communications link 306 to a communications network 302 that can be linked via a communications link 304 to media device 202.

In a more particular example, remote control 220 can include an input device(s)/directional pad 322 and/or any other suitable directional input. In some embodiments, input device(s)/direction pad 322 can include direction pad 222 and select button 224. Additionally or alternatively, any other suitable buttons or other input devices can be included in input device(s)/direction pad 322 such as number buttons, volume and channel controls, etc. In some embodiments, remote control 220 can further include a processor 324, and a transmitter/receiver 326, which can be interconnected with each other and/or with input device(s)/direction pad 322.

In some embodiments, remote control 220 can include memory and/or storage (not shown) for storing a computer program for controlling processor 324. For example, the computer program can be stored in read-only memory (ROM), electrically programmable read only memory (EPROM), electrically erasable programmable read only memory (EEPROM), flash memory, etc.

Processor 324 can use the computer program to cause signals to be transmitted from remote control 220 through communications link 306 and communications network 302 to media device 202 via communications link 304. These signals can be transmitted using transmitter/receiver 326, which can include one or more transmitters, receivers, antennas, transmitter/receivers, etc. Transmitter/receiver 326 can transmit and/or receive signals using any suitable technologies and/or frequencies. For example, transmitter/receiver 326 can transmit and/or receive radio signals, infrared signals, near-infrared signals, ultrasonic signals, etc.

Communications links 304 and 306 can be any communications links suitable for communicating data between remote control 220 and media device 202, such as radio frequency links, infrared links, near-infrared links, wireless links, network links, HDMI links, USB links, any other suitable communications links, or any suitable combination of such links. In some implementations, communication link 304 and communication link 306 can be the same communication link or different communication links. For example, a radio signal (such as a microwave signal) can be sent from remote control 220 through communications network 302 (e.g., a space between remote control 220 and media device 202), which can then be received at media device 202. In such an example, communication link 304 and communication link 306 are the same (e.g., the microwave signal).

As another example, a radio signal (such as a microwave signal) can be sent from remote control 220 and received at a converter (not shown) that converts the microwave signal to a near-infrared signal. In such an example, the converter can transmit the near-infrared signal, which can then be received by media device 202. In this example, communication link 306 is the radio signal, and communication link 304 is the near-infrared signal and the converter is part of communications network 302.

In some implementations, direction pad 322 can include a number of switches that, when activated, indicate a directional input. For example, direction pad 322 can include a button that a user can press to indicate a direction. This button can activate one or more of the switches, and a signal from the one or more switches can be correlated by processor 324 with a direction indicated by pressing the button.

Direction pad 322 and processor 324 can be configured to accept any suitable number of inputs for various directions in accordance with some implementations. For example, processor 324 can be configured to detect inputs in four directions (e.g., up, down, left and right) from directional pad 322. In another example, processor 324 can be configured to detect eight directional inputs (e.g., up, down, left, right and intermediate directions, such as, up-right diagonal, up-left diagonal, down-right diagonal, and down-left diagonal) from directional pad 322. In yet another example, processor 324 can be configured to detect inputs in any arbitrary direction from directional pad 322. In such an example, directional pad 322 can include touch sensors that can be used to detect an arbitrary position of an input to directional pad 322.

In some embodiments, input device 322 can include any other suitable features such as an alphanumeric keypad, a power button, an input selection button, channel buttons, volume buttons, a volume mute button, directional buttons, media playback buttons (e.g., rewind, pause, play, and fast-forward buttons), a dedicated button that accesses downloadable applications for use by the media device, a microphone or other suitable audio input, a camera, etc. In some embodiments, input device 322 can include hardware buttons and/or software buttons (e.g., programmable buttons). In some implementations, input device 322 can also include other inputs, such as, a computer keyboard, a cursor-controller, a dial, a switchbank, a lever, a touchscreen, and/or any other suitable input device.

In some embodiments, system 300 can include one or more media devices 202, such as a media playback device for viewing media content listings and/or obtaining and presenting content items from various sources (e.g., broadcast content, on-demand content, locally stored content, Internet content, etc.). For example, media device 202 can be implemented as a television, a smart television, a set-top box, a streaming media device, a digital media receiver, a computer, a gaming console, an optical media player, etc. In some embodiments, remote control 220 and media device 202 can be local to each other or remote from each other. For example, remote control 220 and media device 202 can be located in the same room. In some embodiments, media device 202 can execute process 100 and/or present user interface 200.

In some embodiments, media device 202 can include a display/input device 312, a processor 314, memory 316, and one or more transmitters, receivers, and/or transmitter/receivers 318, which can be interconnected.

In some embodiments, media device 202 can include a storage device, such as a hard drive, a digital video recorder, a solid state storage device, a removable storage device, or any other suitable device for storing guidance information and/or remote control instructions. In a more particular example, the storage device can store a computer program for controlling processor 314 in media device 202 (e.g., responsive to instructions received from remote control 220).

Processor 314 can use the computer program to present content on display/input device 312 and control a user interface, which can include user interface 200, to allow a user to interact with the content and to send and receive data through communication link 304 using transmitter/receiver 318. In some embodiments, transmitter/receiver 318 can transmit and/or receive radio signals, infrared signals, near-infrared signals, ultrasonic signals, etc. In cases where transmitter/receiver 326 and transmitter/receiver 318 operate using different types of signals, a converter (not shown) can be used to convert instructions transmitted using one type of signal (e.g., a radio signal) to another type of signal (e.g., a near-infrared signal). It should be noted that data received through communications link 304 or any other communications links can be received from any suitable source. It should also be noted that transmitter/receiver 326 and transmitter/receiver 318 can operate using any suitable type of signals or combination thereof, including digital signals, analog signals, etc.

Display/input device 122 can include input devices such as a computer keyboard, a cursor-controller, one or more buttons, a dial, a switchbank, a lever, a touchscreen, and/or any other suitable input device.

In some embodiments, remote control 220 and media device 202 can be any of a general purpose device such as a computer or a special purpose device such as a remote control, a smartphone, a tablet computer, a set-top box, a smart TV, a game console, a gamepad (e.g., a controller for a game console), a digital media receiver, a server, etc., or any suitable combination of such devices. Any of these general or special purpose devices can include any suitable components such as a hardware processor (which can be a microprocessor, digital signal processor, a controller, etc.), memory, communication interfaces, display controllers, input devices, etc. For example, media device 202 can be implemented as a set-top box, a digital media receiver, a smart TV, a television, a laptop computer, a personal computer, a server, a smartphone, a tablet computer, a game console, etc. In some embodiments, media device 202 can include a combination of devices, such as a television and a game console, or a television and a digital media receiver, where a first device (e.g., the game console or the digital media receiver) can execute process 100, and a second device can be used to present user interface 200 (e.g., the television). Additionally or alternatively, instructions from a remote control can be received by a device that is not executing process 100 (e.g., a television, a second screen device such as a smartphone, a game console) and these instructions can be relayed to a device that is executing process 100 such as a digital media receiver, a streaming media device, or any other suitable device executing process 100.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In some embodiments of the disclosed subject matter, the above described steps of the process of FIG. 1 can be executed or performed in any order or sequence not limited to the order and sequence shown and described in the figures. Also, some of the above steps of the process of FIG. 1 can be executed or performed substantially simultaneously where appropriate or in parallel to reduce latency and processing times. Furthermore, it should be noted that FIG. 1 is provided as an example only. At least some of the steps shown in these figures may be performed in a different order than represented, performed concurrently, or omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Accordingly, methods, systems, and media for navigating a user interface based on directional inputs are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method of navigating a user interface, the method comprising:
 causing, using a hardware processor of a media device, a user interface to be presented that includes a plurality of media identifier elements, wherein a first media identifier element at a first media identifier position is highlighted from among the plurality of media identifier elements;
 causing an options element to be presented in a first options element position connection with the highlighted first media identified element;
 receiving an instruction from a user input device associated with the media device to navigate to a second media identifier element of the plurality of media identifier elements along a direction that corresponds to the first options element position, wherein the second media identifier element is located at a second media identifier position;
 determining a second options element position based on a number of directional elements needed to navigate to the options element from the second media identifier position; and
 causing the options element to be presented at the second options element position.

2. The method of claim 1, wherein each media identifier element corresponds to a plurality of media assets.

3. The method of claim 1, wherein each media identifier element corresponds to a channel of media content.

4. The method of claim 1, wherein highlighting the first media identifier element comprises causing a preview of media assets associated with the first media identifier element to be presented.

5. The method of claim 1, wherein the plurality of media identifier elements are arranged in a grid comprised of a first direction and a second direction.

6. The method of claim 1, wherein the first options element position is a position between the first media identifier position and the second media identifier position.

7. A system of navigating a user interface, the system comprising:
 a user input device; and
 a media device that includes a hardware processor that is connected to the user input device, wherein the hardware processor is configured to:
  cause a user interface to be presented that includes a plurality of media identifier elements, wherein a first media identifier element at a first media identifier position is highlighted from among the plurality of media identifier elements;
  cause an options element to be presented in a first options element position connection with the highlighted first media identified element;
  receive an instruction from a user input device associated with the media device to navigate to a second media identifier element of the plurality of media identifier elements along a direction that corresponds to the first options element position, wherein the second media identifier element is located at a second media identifier position;
  determine a second options element position based on a number of directional elements needed to navigate to the options element from the second media identifier position; and
  cause the options element to be presented at the second options element position.

8. The system of claim 7, wherein each media identifier element corresponds to a plurality of media assets.

9. The system of claim 7, wherein each media identifier element corresponds to a channel of media content.

10. The system of claim 7, wherein highlighting the first media identifier element comprises causing a preview of media assets associated with the first media identifier element to be presented.

11. The system of claim 7, wherein the plurality of media identifier elements are arranged in a grid comprised of a first direction and a second direction.

12. The system of claim 7, wherein the first options element position is a position between the first media identifier position and the second media identifier position.

13. A non-transitory computer-readable medium containing computer executable instructions that, when executed by a processor, cause the processor to perform a method of navigating a user interface, the method comprising:

causing a user interface to be presented that includes a plurality of media identifier elements, wherein a first media identifier element at a first media identifier position is highlighted from among the plurality of media identifier elements;

causing an options element to be presented in a first options element position connection with the highlighted first media identified element;

receiving an instruction from a user input device associated with the media device to navigate to a second media identifier element of the plurality of media identifier elements along a direction that corresponds to the first options element position, wherein the second media identifier element is located at a second media identifier position;

determining a second options element position based on a number of directional elements needed to navigate to the options element from the second media identifier position; and causing the options element to be presented at the second options element position.

14. The non-transitory computer-readable medium of claim 13, wherein each media identifier element corresponds to a plurality of media assets.

15. The non-transitory computer-readable medium of claim 13, wherein each media identifier element corresponds to a channel of media content.

16. The non-transitory computer-readable medium of claim 13, wherein highlighting the first media identifier element comprises causing a preview of media assets associated with the first media identifier element to be presented.

17. The non-transitory computer-readable medium of claim 13 wherein the plurality of media identifier elements are arranged in a grid comprised of a first direction and a second direction.

18. The non-transitory computer-readable medium of claim 13, wherein the first options element position is a position between the first media identifier position and the second media identifier position.

* * * * *